(12) United States Patent
Strobel et al.

(10) Patent No.: US 6,780,519 B1
(45) Date of Patent: Aug. 24, 2004

(54) FLAME-TREATING PROCESS (75) Inventors: Mark A. Strobel, Maplewood, MN (US); Christopher S. Lyons, St. Paul, MN (US); Donald J. McClure, Shoreview, MN (US); Mark D. Nachbor, Plymouth, MN (US); John R. Park, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 112 days.

(21) Appl. No.: 09/724,615

(22) Filed: Nov. 28, 2000

(51) Int. Cl.⁷ .......................... B32B 15/08; B29C 59/08
(52) U.S. Cl. ................. 428/458; 428/461; 427/223; 427/225; 264/80; 264/446
(58) Field of Search ................. 428/458, 461; 427/223, 225; 264/80, 446

(56) References Cited

U.S. PATENT DOCUMENTS

| | | |
|---|---|---|
| 3,364,056 A | 1/1968 | Seibel |
| 3,431,135 A | 3/1969 | Keane et al. |
| 4,011,121 A | 3/1977 | Doss |
| 4,645,702 A * | 2/1987 | Asakura et al. ............. 428/141 |
| 5,506,059 A | 4/1996 | Robbins et al. ............. 428/457 |
| 5,660,892 A | 8/1997 | Robbins et al. ............. 427/537 |
| 5,753,754 A | 5/1998 | Strobel et al. ................. 525/61 |
| 5,891,967 A | 4/1999 | Strobel et al. ............. 525/383 |
| 5,900,317 A | 5/1999 | Strobel et al. ............. 428/412 |
| 5,997,997 A * | 12/1999 | Angelopoulos et al. ..... 428/209 |

FOREIGN PATENT DOCUMENTS

JP     10-130947     5/1998

* cited by examiner

*Primary Examiner*—Monique R. Jackson (57) ABSTRACT

The present invention provides a method of modifying the surface of a polymeric substrate, e.g., to improve the wettability of the polymer film surface and/or alter the metal adhesion properties of the surface of the substrate by exposing the substrate to a flame. The flame is supported by an oxidizer and fuel mixture that includes an effective amount, for modifying the polymeric substrate, of at least one sulfur-containing compound that functions as a fuel substitute. In addition, substrates are provided that have increased wettability or increased metal adhesion performance.

18 Claims, 2 Drawing Sheets

FLAME-TREATING PROCESS

FIELD OF THE INVENTION

This invention relates to a method of flame treating polymeric substrates to modify the surface properties of the substrate and to articles treated by the method.

BACKGROUND OF THE INVENTION

Flame treating is used to improve the wetting and adhesion properties of polymer film surfaces in general and of polyolefin film surfaces in particular. The most wettable surface-modified polymer films usually have optimal adhesion properties in a variety of practical applications. The enhanced wetting property results in improved coatability and adhesion of materials such as pressure-sensitive adhesives, primers and low-adhesion release coatings. Enhanced wetting properties are particularly useful in coating water-borne solutions at all film speeds and in coating solvent-borne materials at high coating speeds.

Flame treaters ordinarily use premixed flames, i.e., the fuel and oxidizer are thoroughly mixed prior to combustion and the rate of combustion is controlled by the rate of chemical reaction that occurs in the flame. In a premixed flame, the luminous region is that portion of the flame where the rise in temperature is the greatest and where much of the reaction and heat release occur. During a flame-treating process, one side of a polymer film is passed in close proximity to a flame while the other side of the polymer surface generally passes over a cooled support, e.g., a cooled drum, to minimize heat distortion.

Flames are commonly described in terms of two characteristics: the flame power and the molar ratio of oxidizer to fuel. The flame power is the product of the volume of fuel burned per unit time and the heat content of the fuel. Typical units for the flame power are W or Btu/hr. In fame treating, the flame power can be normalized to account for the dimensions of the burner, leading to units such as $W/cm^2$ or $Btu/hr-in^2$. The exact ratio of oxidizer to fuel needed for complete combustion is known as the stoichiometric ratio. For example, the exact amount of dry air necessary for the complete combustion of methane is 9.55 volumes per volume of methane; so the stoichiometric ratio for an air:methane flame is 9.55:1. The equivalence ratio is defined as the stoichiometric oxidizer:fuel ratio divided by the actual oxidizer:fuel ratio. For fuel-lean, or oxidizing, flames, there is more than the stoichiometric amount of oxidizer and so the equivalence ratio is less than one. For oxidizer:fuel mixtures at the stoichiometric ratio, the equivalence ratio is equal to one. For fuel-rich systems, the equivalence ratio is greater than one.

Virtually all industrial flame treaters use a premixed laminar (as opposed to turbulent) flame with air as the oxidizer and a gaseous hydrocarbon as a fuel. Typical hydrocarbon fuels include hydrogen, natural gas, methane, ethane, propane, butane, ethylene, liquefied petroleum gas, acetylene, or blends thereof, and city gas, which is often composed of a mixture of carbon dioxide, carbon monoxide, hydrogen, methane, and nitrogen. Halogen and halogen-containing compounds have also been disclosed as oxidizer:fuel mixture additives to increase the adhesivity of polyolefin films to subsequent coatings.

Recently, hydrocarbon flames enriched with fuel and oxidizer substitutes that contain either or both oxygen and nitrogen atoms or silicon atoms have demonstrated substantial increases in wetting values on polymer films relative to a non-enriched flame process.

Improved adhesion of metal coatings to polymeric substrates has been demonstrated on different types of substrates, some polymerized from a mixture containing monomer and a sulfur-containing compound such as barium sulfate, and others made by exposing a polymeric surface to a vacuum glow discharge or plasma created with a sulfur-containing gas such as hydrogen sulfide.

Because of the benefit that the increased wettability of polymer surfaces has on the coating industry, there is an ongoing need for processes that improve the wettability of polymer films. In addition; because metal coatings are desired on a wide variety of polymeric surfaces, there is an ongoing need for processes that enhance the adhesion of metal to polymeric surfaces.

SUMMARY OF THE INVENTION

The present invention provides a method of modifying the surface of a polymeric substrate, e.g., to improve the wettability of the polymer substrate surface or to improve the adhesion of the polymeric substrate to a subsequently applied metal coating layer. Increased affinity occurs between a polymeric substrate and a metal layer that does not have an increased affinity to the surface of the polymeric substrate when it is further oxidized. The method of the invention comprises exposing the substrate to a flame that is supported by an oxidizer and fuel mixture that includes at least one sulfur-containing compound that functions as a fuel substitute.

In one preferred embodiment, the oxidizer and fuel mixture has an equivalence ratio that is either fuel-lean or stoichiometric and the resulting flame-treated polymeric film exhibits improved wettability. Surprisingly, the treated surface of the polymeric film generally has at least one oxidized sulfur-containing chemical group and at least one nitrogen-containing chemical group. These films provide improved wettability.

In another preferred embodiment, the fuel and oxidizer mixture has an equivalence ratio that is fuel-rich and the resulting flame-treated polymeric film exhibits improved adhesion to a subsequently applied metal coating. The treated surface of the polymeric film generally has at least one oxidized sulfur-containing chemical group and at least one unoxidized sulfur-containing chemical group.

This invention also provides novel articles. One article provided by this invention is a polymeric surface having at least one oxidized sulfur-containing chemical group and at least one nitrogen-containing chemical group from the group consisting of nitroso and nitrosoamine. Another article provided is a polymeric surface having at least one oxidized sulfur-containing chemical group and at least one unoxidized sulfur-containing chemical group.

Large increases in wettability as measured by ASTM D-2578-84 Wetting Test, e.g., greater than 16 $mJ/m^2$ over that obtained with conventional flame-treating processes using natural gas, have been observed in a preferred polymeric substrate treated according to this invention. In addition, significant increases in the adhesion of polymeric substrate surfaces to a metal, e.g., over 50 percent increase for polypropylene to silver, have been observed.

DETAILED DESCRIPTION OF THE INVENTION

The present invention provides a method for modifying a polymeric surface that involves exposing the surface of the polymeric substrate to a flame that is supported by an oxidizer and fuel mixture that includes at least one sulfur-containing compound that functions as a fuel substitute.

Flame treating is a method of oxidizing a polymeric surface to achieve a more wettable surface and one that is more adherent to metals that react with oxidized chemical groups. However, there are many instances where different types of chemical modification of the surface would be useful.

Polymeric substrate surfaces that are more wettable or have improved adhesion to metallic layers are useful in the coating industry. Polymeric substrate surfaces that are more wettable generally permit a more intimate contact with subsequent coating solutions, suspensions or dispersions and thus cause them to be more easily coated onto the polymeric substrate surface. The improved contact also often results in improved adhesion between the polymeric substrate surface and the coating once the coating is dried. Polymeric surfaces that are modified to become more wettable are generally more oxidized. Oxidized surfaces are more adherent to some subsequently applied materials that are able to react with the oxidized surface. The inventors have discovered a flame-treating process that is able to either improve the wettability of a polymeric surface or increase the adhesion of a polymeric surface to a subsequently applied metal coating, particularly those that are not reactive to an oxidized surface. The primary adjustments are the type and amount of fuel-substitute selected and the equivalence ratio of the oxidizer:fuel mixture used to support the flame.

Oxidizers have higher electronegativity than fuels. The oxidizer reacts exothermically with the fuel to form chemical species that are more thermodynamically stable. Suitable oxidizers are air and oxygen-enriched air. Suitable fuels include, for example, natural gas, methane, ethane, propane, butane, ethylene, liquefied petroleum gas, acetylene or blends thereof.

The sulfur-containing compound that is included in the oxidizer:fuel mixture is a fuel-substitute that may be either inorganic or organic. Suitable inorganic sulfur-containing compounds include, for example, hydrogen sulfide. Suitable organic sulfur-containing compounds include, for example, mercaptans such as methyl mercaptan. Sulfur-containing compounds that are gases at room temperature and pressure are easier to premix with other materials into the oxidizer-:fuel mixture than sulfur-containing compounds that are liquids at room temperature.

The effective amount of sulfur-containing compound needed to modify the surface of a polymer substrate is the amount that results in sulfur being deposited on a polymeric surface. Effective amounts can be up to more than 20 molar percent and will depend on the sulfur-containing compound used and the effects desired. The amount of sulfur-containing compound used is expressed in terms of molar percent. Molar percent is defined as 100 times the molar flow of the sulfur-containing compound divided by the sum of the molar flow of the sulfur-containing compound and the molar flow of the fuel. Surprisingly, the presence of only a small amount of the sulfur-containing compound resulted in a substantial increase in wettability for the materials and conditions used in Example 1. Sufficient sulfur-containing compound is included to replace part of the fuel and function as a fuel substitute; for example, the mercaptan included as an odorant in natural gas in trace amounts is not regarded as a fuel substitute. Generally, the sulfur-containing compound comprises 0.1 molar percent or more of the fuel, and preferably comprises 0.5 or more molar percent of the fuel. Also, surprisingly, nitrogen-containing chemical groups were affixed to the polymeric surface at some equivalence ratios even though no nitrogen-containing fuel or oxidizer substitute was present. Nitrogen from air is generally thought to be inert under flame-treating conditions.

The optimal concentrations of oxidizer, fuel and sulfur-containing compound in the oxidizer:fuel: compound mixture are determined by calculating the stoichiometric ratio of the blend and experimentally determining the equivalence ratio that is optimal for the particular materials used and the effects desired. Typically, the accuracy of the equivalence ratio is within 0.02 of the recorded value. First, the stoichiometric ratio of oxidizing material to oxygen-reactive material, or oxidizer to fuel, is calculated for the complete combustion of the materials in the oxidizer:fuel: compound mixture. Then the optimal equivalence ratio, defined as the stoichiometric oxidizer:fuel ratio divided by the actual oxidizer:fuel ratio that results in optimal surface modification, is experimentally determined. The stoichiometric ratio for the combustion of hydrogen sulfide by air is 7.15:1, based on the reaction: $H_2S + 1.5\ O_2 \rightarrow SO_2 + H_2O$ and a molar concentration of oxygen in dry air of 20.95 percent. The stoichiometric ratio for the combustion of methyl mercaptan by air is 14.3:1, based on the reaction: $CH_3SH + 3\ O_2 \rightarrow CO_2 + SO_2 + 2\ H_2O$ and a molar concentration of oxygen in dry air of 20.95 percent.

Flame treating a polymeric surface with a fuel-lean or stoichiometric flame results in a surface having both oxidized sulfur-containing chemical groups and nitrogen-containing chemical groups. The latter groups exhibit a binding energy of about 402.4 eV as measured by Electron Spectroscopy for Chemical Analysis (ESCA) also known as X-ray Photoelectron Spectroscopy (XPS). This binding energy is known to be associated with nitroso (—NO) or nitrosoamine (=N—N=O) chemical groups. The presence of the nitrogen-containing chemical species was unexpected because no nitrogen-containing oxidizer substitute or fuel substitute compounds were added to the oxidizer:fuel mixtures.

Oxidized sulfur-containing chemical groups have binding energies of about 168.8 eV as measured by ESCA. These groups include, for example, sulfates (—$RSO_4R'$), sulfones (—$RSO_2R'$), sulfonates (—$RSO_3R'$) and sulfonic acids (—$RSO_3H$). They are associated with improved wettability and also can be applied by gas, plasma, or liquid processes.

The nitrogen affixation obtained from the invention is different from that obtained from known flame-treating processes. The nitrogen in air is generally inert in flame-treating conditions. Thus, nitrogen-containing chemical groups are generally not affixed to polymeric surfaces by flame treatment with flames supported by mixtures of typical hydrocarbon fuels and air. Additionally, use of nitrogen-containing fuel-substitutes or oxidizer-substitutes result in a different assortment of nitrogen-containing chemical groups. As disclosed in U.S. Pat. No. 5,753,754 (Strobel et al.), both oxidized-nitrogen (organic nitrates and/or nitrites) and reduced-nitrogen (amine, amide, imine and/or nitrile) functionalities are affixed. Other nitrogen-affixing processes, such as plasma or corona treatment, only generate reduced-nitrogen functionalities. However, these processes are not known to affix nitroso or nitroso-amine chemical groups in isolation from other nitrogen-containing chemical groups or even as a dominant concentration of nitrogen-containing chemical groups. Also, these processes are not known to be desirable, or even used, in tandem with those used to affix oxidized sulfur-containing chemical groups to polymeric surfaces. In so far as known, the presence of both oxidized sulfur-containing chemical groups and nitroso and/or nitrosoamine chemical groups is unique. The substantial increase in wettability is highly beneficial.

Flame treating a polymeric surface with a fuel-rich flame that contains a sulfur-containing compound results in a surface having both oxidized sulfur-containing chemical groups and unoxidized sulfur-containing chemical groups present. The oxidized sulfur-containing chemical groups were described previously. The unoxidized sulfur-containing chemical groups have binding energies of about 163.8 eV as measured by ESCA. These groups include, for example, sulfides (—R—S—R') and thiols (—R—SH). They are associated with improved adhesion to metals that are not adhered by reaction with oxidized surfaces. These groups can be applied with plasma processes as disclosed in U.S. Pat. No. 5,506,059 (Robbins et al.) and U.S. Pat. No. 5,660,892 (Robbins et al.). Surprisingly, increased metal adhesion was observed on surfaces treated by the fuel-rich embodiment of the invention that had both oxidized and unoxidized sulfur-containing chemical groups. Also unexpectedly, the adhesion to a subsequently applied metal increased even though the wettability of the substrate appeared in some cases to at least decrease when compared with the wettability obtained by flame treating a surface with a flame supported by an oxidizer:fuel mixture of the same equivalence ratio but not containing fuel substitute sulfur-containing compounds.

Metals useful for the present invention depend on the material properties, (e.g., electrical conductivity) desired for the resulting metallic film. Nonlimiting examples of metals include chromium, titanium, nickel, copper, tin, indium, gold, and silver, and alloys of them.

The invention is useful with a wide range of polymeric substrates that can have sulfur-containing chemical groups affixed to them. A polymeric substrate is a substrate that has at least one major surface that is polymeric. The polymeric substrates can be of any shape that permits surface modification by flame treatment and include, for example, films, sheets, molded shapes, machined or fabricated parts, porous or nonwoven materials, three-dimensional objects, foams, fibers and fibrous structures. Such polymeric substrates include, for example, polyolefins, such as polyethylene, polypropylene, polybutylene, polymethylpentene; mixtures of polyolefin polymers and copolymers of olefins; polyolefin copolymers containing olefin segments such as poly (ethylene vinylacetate), poly(ethylene methacrylate) and poly(ethylene acrylic acid); polyesters, such as poly (ethylene terephthalate), poly(butylene phthalate) and poly (ethylene naphthalate); acetates such as cellulose acetate, cellulose triacetate and cellulose acetate/butyrate; polyamides such as poly(hexamethylene adipamide); polyurethanes; polycarbonates; acrylics such as poly(methyl methacrylate); polystyrenes and styrene-based copolymers; vinylics such as poly(vinyl chloride), poly(vinylidone dichloride), poly(vinyl alcohol) and poly(vinyl butyral); ether oxide polymers such as poly(ethylene oxide) and poly(methylene oxide); ketone polymers such as polyetheretherketone; silicones such as polydimethylsiloxane; fluoropolymers such as polytetrafluoroethylene, polyvinylidene fluoride and fluorinated ethylene propylene; epoxies; polyimides; mixtures thereof, or copolymers thereof.

Flame-treating equipment useful for the invention is any that can provide a flame in close proximity to the polymeric substrate surface, thus modifying the characteristics of the polymer surface. Generally, when the polymeric substrate is a film, the film surface is flame treated as the film passes over a cooled support, e.g., a cooled roll, to prevent film distortion. However, cooling rolls are not necessary. For example, the film may be sufficiently cooled by being suspended between two supports. Flame-treating equipment includes commercial systems manufactured by, for example, The Aerogen Company, Ltd., Alton, United Kingdom, and Flynn Burner Corporation, New Rochelle, N.Y. Preferably the equipment has a mixer to combine the oxidizer and fuel before they feed the flame used in the flame-treating process of the invention. A ribbon burner is best suited for the flame treatment of polymer films, but other types of burners may also be used.

The flame has an optimal distance from the polymeric substrate surface and is supported by mixture of oxidizer and fuel. The distance between the tip of the luminous cone of the flame and the surface of the polymeric substrate has an effect on the degree of surface-property enhancement that is observed. Generally, useful distances are less than 30 mm and can be as low as –2 mm, i.e., the film is contacted by the flame and occupies space that would otherwise comprise the terminal 2 mm of the flame tip. Preferably the distance is between 0 mm and 10 mm and more preferably between 0 mm and 2 mm.

This invention is further illustrated by the following examples that are not intended to limit the scope of the invention. The following test methods were used to evaluate and characterize film surfaces produced in the examples.

Advancing and Receding Contact Angles

Measurements of the advancing and receding contact angles in air of deionized, filtered water on the test sample surfaces were made using the Wilhelmy plate method on a Cahn DCA-322 dynamic contact-angle instrument. The surface tension of the water was measured as 72.6 mN/m at 21° C. using the microbalance. A three-layer laminate was prepared using SCOTCH BRAND™ No. 666 double-coated tape to mount the treated sides of the film outward. Samples were sandwiched between two sheets of untreated, biaxially-oriented polypropylene film during handling to prevent contamination during the preparation of this laminate. The laminate was cut into a 2.5×2.5 cm square for analysis. The stage speed was 49.8 μm/s with a travel distance of about 1 cm. The volume of water used for the contact-angle measurements was about 50 mL, with a fresh volume of water used for each sample analyzed. The advancing and receding contact angles were calculated using a software routine supplied with the Cahn instrument that uses linear-regression for the buoyancy correction. Typical standard deviations for the contact-angle measurements were 2–3°.

ASTM D-2578-84 Wetting Test

Measurement of the wetting tension of a polymer film surface is made by wiping a series of liquids of different surface tensions over different regions of the surface of a polymer film sample. The wetting tension of the film surface is approximated by the surface tension of the liquid that just wets the film surface for approximately two seconds. The untreated polypropylene films used in this study had an ASTM wetting test value of 29 mJ/m$^2$. The typical standard deviation for the ASTM wetting test was ±2 mJ/M$^2$. Results are the average of six samples unless otherwise noted.

Surface Composition Determination

X-ray photoelectron spectroscopy (XPS or ESCA) spectra were obtained on a Kratos Axis Ultraspectrometer using a monochromatic Al K$_\alpha$ photon source at an electron take-off angle with respect to the surface of 38°. The pass energy was 40 eV. Spectra were referenced with respect to the 285.0 eV carbon 1s level observed for hydrocarbon. From the ESCA spectra, O/C, S/C and N/C atomic ratios were obtained. The typical standard deviation of the O/C, S/C and N/C atomic ratios obtained from ESCA was ±0.01. Thus reported values were rounded to the nearest 0.005 if a peak was present.

Metal Adhesion Test

The metal adhesion property of a sample was determined using silver. Samples were metallized by affixing them to the substrate holders in a Mark 50 batch coater, available from CHA Industries, Fremont, Calif. The system was pumped to a pressure of 9×10$^{-6}$ torr before the deposition commenced. Silver was applied, by e-beam evaporation, to a thickness of 120 nm at a rate of 1.8 nm/s (other methods for applying a metal layer could also be used including, for example, sputtering and thermal vapor deposition). The metallized surface of the sample was laminated onto a poly(ethyl acrylic acid) film that had been pre-laminated onto aluminum panels. Lamination was done using HIX N-840 Heat Transfer Machine available from HIX Corporation, Pittsburg, Kans. with a smooth rubber bottom platen and using a lamination temperature of about 102° C. (215° F.+/−3° F.), a dwell time of 4 minutes and a lamination pressure of about 172 kPa (25 psi). Peels were performed on a Sintech Model 1 Tensile Tester available from MTS Systems Corp., Eden Prairie, Minn. by pulling on a tab of the metallized sheeting while holding the sample panel in a fixture. Sample panels were translated as the sample was peeled so that a 90-degree peel angle, relative to the aluminum panel, was maintained. The rate of peel was 30 cm/min (12 in/min). Although adhesion results are reported for silver, improved adhesion would also be expected for other metals.

Examples 1–4 and Comparative Examples 1–2

Examples 1–4 illustrate the effect of a sulfur-containing compound in the flame on the surface properties of a polymeric film.

In Example 1, an oxidizer composed of dust-filtered, 25° C. compressed air with a dew point of less than −20° C. was premixed with the components of a fuel mixture composed of 98 molar percent of a natural gas fuel (having a specific gravity of 0.577, a stoichiometric ratio of dry air: natural gas of 9.6:1, and a heat content of 37.8 kJ/L) and 2 molar percent of a sulfur-containing compound (industrial-grade hydrogen sulfide fuel with a stoichiometric ratio for dry air: hydrogen sulfide of 7.15:1 and a heat content of 24.0 kJ/L) in a venturi mixer, Flowmixer Model 1210-1-14 available from Pyronics Inc., Cleveland, Ohio, to form a combustible mixture. The flows of the air, natural gas, and hydrogen sulfide were measured with Brooks Instrument Model 5812 (8–400 Lpm), Brooks Instrument Model 5811 (1–50 Lpm), and Tylan General Model FC-2911KZ (1–20 Lpm) mass flowmeters, respectively. The mass flowmeters were calibrated using in-line Rockwell International cumulative-flow meters that operate on the displacement principle. The natural gas and air flows were controlled with Badger Meter Inc. control valves while the hydrogen sulfide flow was controlled with a valve integral to the Tylan General mass flowmeter. All flows were adjusted to result in a flame equivalence ratio of 0.97 (a fuel-lean combustible mixture) and a normalized flame power of 330 W/cm$^2$. The combustible mixture passed through a 6 m long pipe to a ribbon burner, a 35 cm×1 cm stainless steel ribbon mounted in a cast-iron housing and available as Part No. FMB-206 from The Aerogen Company Ltd., Alton, United Kingdom.

The burner was mounted beneath a 25 cm diameter, 40 cm face-width, steel chill roll, available from American Roller Company, Kansasville, Wis., with an ARCOTHERM™ TC-10 ceramic coating and water-cooled to 30° C. An electric spark ignited the combustible mixture. Stable conical flames were formed with luminous tips 2–3 mm above the topmost surface of the ribbon burner. Biaxially oriented 0.05 mm (2 mil) thick, 30 cm wide homopolymer polypropylene (PP) film, moving at 125 m/min, was guided by idler rolls to wrap around the bottom half of the chill roll. The distance between the uppermost surface of the ribbon burner and the chill roll was adjusted to maintain a distance of 2±1 mm between the tips of the luminous stable flame cones and the surface of the polypropylene film. To insure intimate contact between the substrate and the chill roll, a 10 cm diameter, 40 cm face-width nip roll was located at the 9 o'clock position on the input side of the chill roll as the film moves from left to right. The nip roll was covered with 80–90 Shore A durometer polyether urethane rubber and available from American Roller Company. The front side of the polypropylene film was flame treated by exposure to a laminar premixed flame while the backside was cooled by contact with the chill roll. The actual zone of reactive product gases was somewhat wider than the ribbon-burner downweb dimension of 1 cm. In fact, the plume of reactive product gases tended to be about 15 cm in the downweb direction. Using this value as the dimension of the zone of flame treatment, the exposure time of the polypropylene film to the flame was about 0.07 seconds.

In Examples 2–4, polypropylene films were flame treated as in Example 1 except that the fuel mixtures contained different amounts of hydrogen sulfide ($H_2S$) ranging from 4 molar percent to 8 molar percent, as listed in Table 1. In Comparative Example 1, polypropylene film was flame treated as in Example 1 except that the fuel mixture only contained natural gas. In Comparative Example 2, polypropylene film was not flame treated.

All film samples were tested with the ASTM wetting test and the advancing and receding contact-angle test, while select films were also tested using ESCA. The results are shown in Table 1.

data. The contact angles of water on the polypropylene flame treated at 2 molar percent hydrogen sulfide were significantly lower than on the polypropylene treated in the pure natural gas flame. The ESCA O/C atomic ratios of the flame-treated polypropylene films also showed greater levels of surface oxidation for samples treated with a flame process that used a hydrogen sulfide flame additive.

In addition, both sulfur or sulfur-containing functionalities and nitrogen or nitrogen-containing functionalities were affixed to the polypropylene surface of all the examples. The sulfur that was affixed by the fuel-lean flames of the above examples had an ESCA binding energy of approximately 168.8 eV. This binding energy generally indicates the presence of an oxidized form of sulfur such as sulfone, sulfate, sulfonate, or sulfonic acid groups. The nitrogen that was affixed to the polypropylene was surprising since no nitrogen was affixed to the surface in Comparative Example 1 or 2. This affixed nitrogen had an ESCA binding energy of about 402.4 eV, which is generally indicative of the presence of nitroso (—NO) groups.

Figure 1:
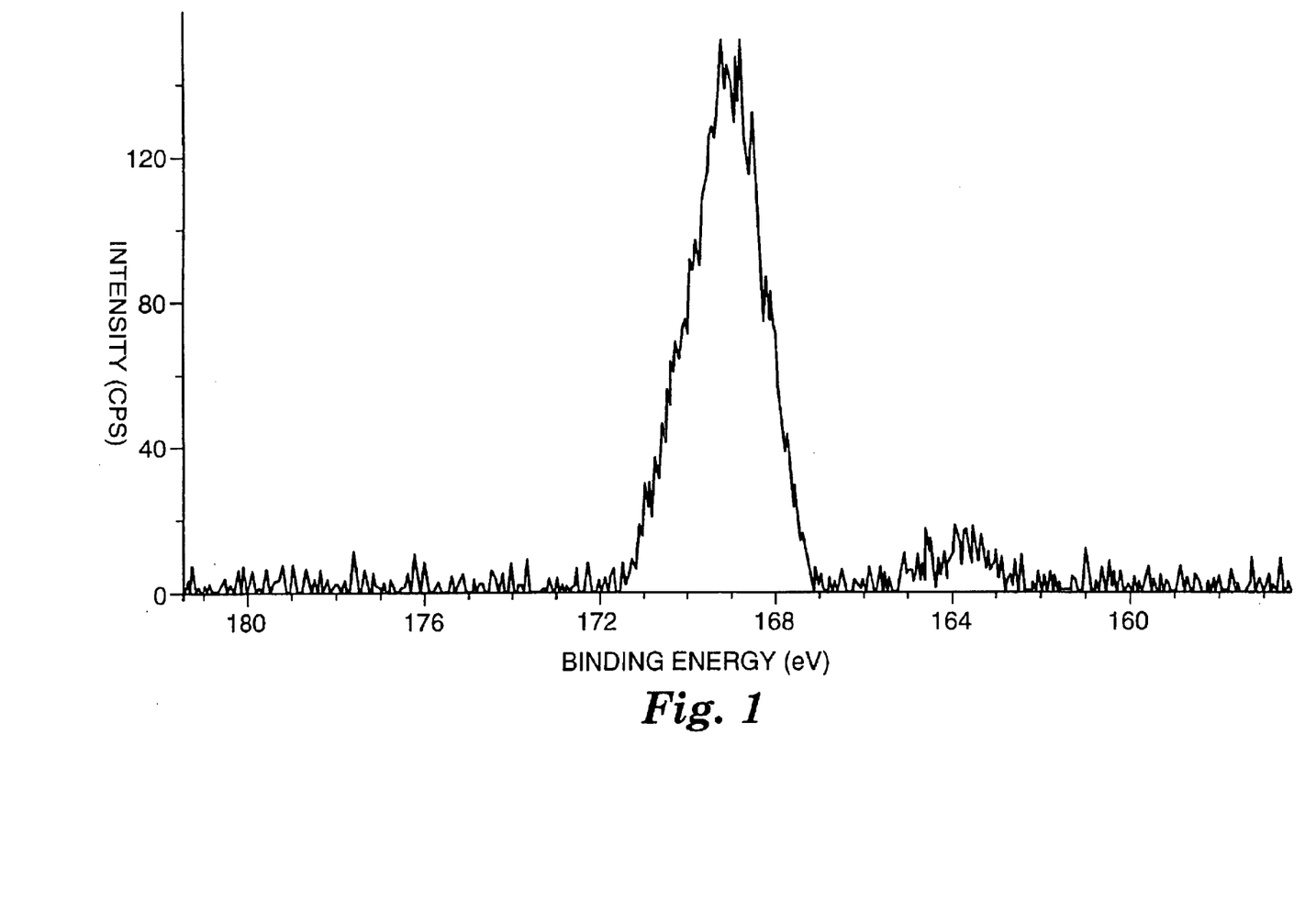
FIG. 1 is an illustration of the ESCA spectra for the treated film surface of Example 2 showing oxidized sulfur-containing chemical groups.

FIG. 1 illustrates the ESCA spectra for sulfur for Example 2. Both nitrogen-containing groups and oxidized sulfur-containing groups were detected but almost no unoxidized sulfur groups were detected.

TABLE 1

| Example | $H_2S$ (%) | Wettability (mJ/m$^2$) | Advancing Angle (Degrees) | Receding Angle (Degrees) | ESCA O/C ratio | ESCA S/C ratio | ESCA N/C ratio |
| --- | --- | --- | --- | --- | --- | --- | --- |
| 1 | 2 | 72 | 79 | 20 | 0.13 | 0.02 | 0.015 |
| 2 | 4 | 71 | 70 | 25 | 0.145 | 0.02 | 0.02 |
| 3 | 6 | 66 | 77 | 33 | — | — | — |
| 4 | 8 | 64 | 83 | 42 | 0.105 | 0.02 | 0.02 |
| C1 | None | 56 | 96 | 35 | 0.09 | 0.0 | 0.0 |
| C2 | None | 29 | 109 | 87 | 0.0 | 0.0 | 0.0 |

As seen in Table 1, polypropylene treated with a flame that contained a fuel substitute sulfur-containing compound was more wettable for some conditions than polypropylene treated in a pure natural gas flame. Treatment with a pure natural gas flame increased the wettability of the film from 29 to 56 mJ/m$^2$. However, films treated with flames containing hydrogen sulfide had wettabilities of up to 72 mJ/m$^2$ when the sulfur-containing compound was present in the fuel at amounts up to about 8 molar percent.

The effectiveness of the sulfur-containing fuel substitute additive was also reflected in the contact angle and ESCA Examples 5–14 and Comparative Example 3

Examples 5–14 illustrate the effect of the equivalence ratio of the sulfur-containing flames on the surface properties of a polymeric film.

Each polypropylene film of Example 5–14 was flame treated as in Example 1 except that the equivalence ratio of the flame was varied from 0.85 to 1.20 (i.e., from fuel lean to fuel rich) as shown in Table 2. Comparative Example 3 was made as Comparative Example 2 except that the equivalence ratio was 1.12. All film samples were tested with the ASTM wetting test, the advancing and receding contact angle test, and ESCA, while select samples were also tested with the Metal Adhesion Test. Results are shown in Table 2 together with the results from Comparative Examples 1–2.

TABLE 2

| Ex. | Equiv. Ratio | Wettability (mJ/m²) | Advancing Angle (Degrees) | Receding Angle (Degrees) | ESCA O/C ratio | ESCA S/C ratio | ESCA N/C ratio | Metal Adhesion N/m |
|---|---|---|---|---|---|---|---|---|
| 5 | 0.85 | 54 | 86 | 45 | 0.14 | 0.02 | 0.03 | — |
| 6 | 0.88 | 67 | 78 | 36 | 0.14 | 0.02 | 0.02 | — |
| 7 | 0.91 | 68 | 71 | 25 | 0.17 | 0.02 | 0.03 | — |
| 8 | 0.94 | 68 | 70 | 25 | 0.22 | 0.03 | 0.04 | — |
| 9 | 0.97 | 72 | 79 | 20 | 0.13 | 0.02 | 0.015 | 0.093 |
| 10 | 1.00 | 66 | 91 | 37 | 0.09 | 0.01 | 0.01 | — |
| 11 | 1.03 | 50 | 102 | 65 | 0.03 | 0.01 | 0.00 | — |
| 12 | 1.09 | 34 | 104 | 70 | 0.02 | 0.01 | 0.00 | — |
| 13 | 1.12 | 32 | 105 | 76 | 0.03 | 0.01 | 0.00 | 0.174 |
| 14 | 1.20 | 32 | 107 | 77 | 0.03 | 0.01 | 0.00 | — |
| C1 | 0.97 | 56 | 96 | 35 | 0.09 | 0.0 | 0.00 | 0.110 |
| C2 | N/A | 29 | 109 | 87 | 0.0 | 0.0 | 0.00 | 0.055 |
| C3 | 1.12 | 34 | 102 | 60 | 0.03 | 0.0 | 0.00 | — |

As shown in Table 2, polypropylene was made most wettable at a flame equivalence ratio of 0.97. However, polypropylene was modified to have the greatest adhesion to silver metal at equivalence ratios greater than 1.0. In Examples 5–10, with fuel-lean and stoichiometric flames, the sulfur affixed to the polypropylene surface had an ESCA binding energy of approximately 168.8 eV, indicative of the presence of oxidized sulfur such as sulfone, sulfate, or sulfonic acid groups. In Examples 11–14, with fuel-rich flames, the affixed sulfur had two different ESCA binding energies; some of the sulfur had the higher binding energy of 168.8 eV while the remaining sulfur had a lower binding energy of approximately 163.8 eV. Sulfur with a lower binding energy is indicative of unoxidized sulfur such as sulfide or thiol groups. The affixation of sulfur by the flame in the form of the unoxidized sulfide and/or thiol groups is surprising because flames are considered to be a highly oxidizing environment. Improved wetting properties correlate to the presence of both the 168.8 eV binding-energy sulfur functionalities and the 402.4 eV binding-energy nitrogen functionalities, while improved adhesion of silver metal was associated with the presence of both the 168.8 eV binding-energy sulfur functionalities and the 163.8 eV binding-energy sulfur functionalities. Improved adhesion of the silver metal did not correlate with improvements in the wettability of the surface, with the additional oxidation of the surface, or with the affixation of nitrogen.

In Examples 5–10, nitrogen was also affixed to the flame-treated polypropylene surface. This affixed nitrogen had an ESCA binding energy of about 402.4 eV, which is associated with the presence of nitroso or nitrosoamine groups. No nitrogen was affixed to polypropylene in Examples 11–14 or Comparative Examples 1 and 3.

Figure 2:
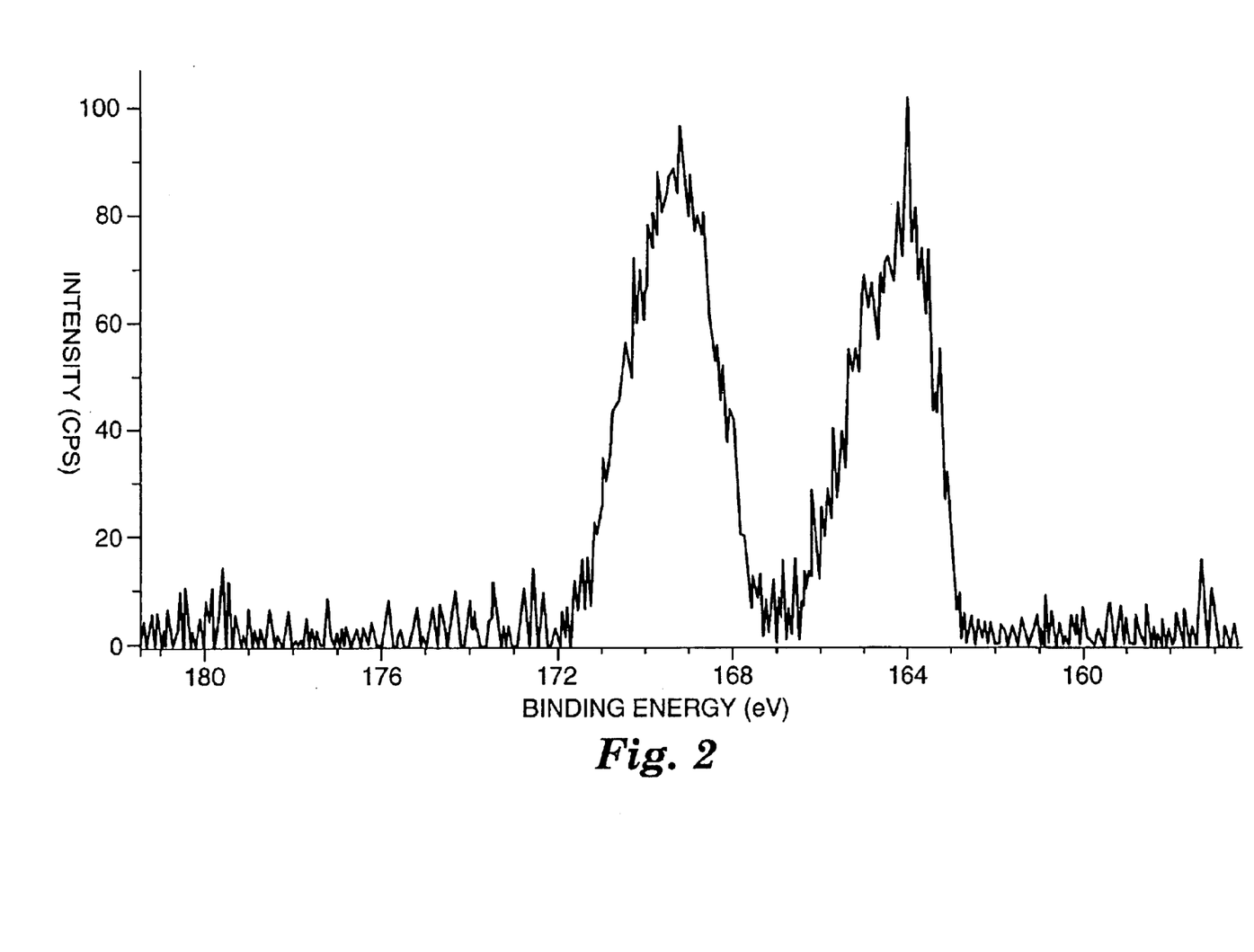
FIG. 2 is an illustration of the ESCA spectra for the treated film surface of Example 13 showing oxidized sulfur-containing chemical groups and unoxidized sulfur-containing chemical groups.

FIG. 2 illustrates the ESCA spectra for sulfur for Example 13. Both oxidized and unoxidized sulfur groups were clearly detected.

Examples 15–18

Examples 15–18 illustrate the effect of another sulfur-containing fuel-substitute additive on the surface properties of a polymeric film.

In Examples 15–18, the polypropylene film was treated as in Example 1 except that the sulfur-containing fuel substitute was different and some process conditions were varied. The fuel mixture contained 2.0 molar percent methyl mercaptan ($CH_3SH$), which has a stoichiometric ratio for combustion in air of 14.3 and a heat content of approximately 51.4 kJ/L, available from Oxygen Service Co., Inc., St. Paul, Minn. The equivalence ratio of the flame was varied from 0.90 to 1.20 as shown in Table 3. All film samples were tested with the ASTM wetting test, the advancing and receding contact angle test, and ESCA. Results are shown in Table 3 together with the results from Comparative Examples 1–2.

TABLE 3

| Example | Equiv. Ratio | Wettability (mJ/m²) | Advancing Angle (Degrees) | Receding Angle (Degrees) | ESCA O/C ratio | ESCA S/C ratio | ESCA N/C ratio |
|---|---|---|---|---|---|---|---|
| 15 | 0.90 | 56 | 77 | 38 | 0.14 | 0.02 | 0.025 |
| 16 | 0.97 | 54 | 81 | 30 | 0.075 | 0.005 | 0.005 |
| 17 | 1.10 | 56 | 93 | 47 | 0.065 | 0.005 | 0 |
| 18 | 1.20 | 34 | 101 | 74 | 0.03 | 0.005 | 0 |
| C1 | 0.97 | 56 | 96 | 35 | 0.09 | 0.0 | 0.0 |
| C2 | N/A | 29 | 109 | 87 | 0.0 | 0.0 | 0.0 |

As shown in Table 3, use of methyl mercaptan as the sulfur-containing fuel substitute also resulted in the affixation of sulfur to the polypropylene surface. The sulfur affixed in Examples 15 and 16 was found to have an ESCA binding energy of about 168.8 eV, indicative of the presence of sulfate, sulfone, or sulfonic acid functionalities. The sulfur affixed to the polypropylene in Examples 17 and 18 was found to have both the high ESCA binding energy of about 168.8 eV and the low ESCA binding energy of about 163.8 eV. Nitrogen at a binding energy of about 402.4 eV was also affixed to the polypropylene in Examples 15 and 16.

Examples 19–21 and Comparative Examples 4–10

Examples 19–21 illustrate the effect of sulfur-containing fuel substitutes on the surface properties of other polymeric films.

Example 19, Comparative Example 4 and Comparative Example 5 were made in a manner similar to Example 1, Comparative Example 1 and Comparative Example 2, respectively, except that the polymeric film was biaxially oriented poly(ethylene terephthalate) (PET) having a thickness of 0.025 mm (1 mil) and a width of 30 cm.

Example 20, Comparative Example 6 and Comparative Example 7 were made in a manner similar to Example 1, Comparative Example 1 and Comparative Example 2, respectively, except that the polymeric film was cast polyethylene (PE) having a thickness of 0.062 mm (2.5 mil) and a width of 15 cm.

Example 21 and Comparative Example 8 were made in a manner similar to Example 1 and Comparative Example 2, respectively, except that the polymeric film was poly (vinylidene fluoride) (PVDF), available as KYNAR 740, having a thickness of 0.05 mm (2 mil) and a width of 30 cm, from Westlake Plastics Co., Lenni, Pa.

All film samples were tested with the ASTM wetting test, the advancing and receding contact angle test, and ESCA. Results are shown in Table 4.

TABLE 4

| Ex. | Film | $H_2S$ | Equiv. Ratio | Wettability (mJ/m$^2$) | Adv. Angle (Deg.) | Receding Angle (Deg.) | ESCA O/C ratio | ESCA S/C ratio | ESCA N/C ratio | ESCA F/C ratio |
|---|---|---|---|---|---|---|---|---|---|---|
| 19 | PET | Yes | 0.97 | 72 | 53 | 4 | 0.49 | 0.15 | 0.02 | 0 |
| CE4 | PET | No | 0.97 | 72 | 60 | 5 | 0.47 | 0 | 0 | 0 |
| CE5 | PET | No | N/A | 46 | 81 | 54 | 0.43 | 0 | 0 | 0 |
| 20 | PE | Yes | 0.97 | — | 55 | 0 | 0.33 | 0.05 | 0.05 | 0 |
| CE6 | PE | No | 0.97 | — | 82 | 19 | 0.15 | 0 | 0 | 0 |
| CE7 | PE | No | N/A | — | 108 | 88 | 0 | 0 | 0 | 0 |
| 21 | PVDF | Yes | 0.97 | — | 72 | 28 | 0.17 | 0.02 | 0.03 | 1.07 |
| CE8 | PVDF | No | N/A | — | 95 | 68 | 0 | 0 | 0 | 1.08 |

In all cases, the flames containing the sulfur-containing fuel substitute affixed sulfur or sulfur-containing functionalities onto the surface of the various polymer films. Wettability was also improved in comparison to those films treated in a flame that did not contain a sulfur-containing fuel substitute.

The various modifications and alterations of this invention will be apparent to those skilled in the art without departing from the scope and spirit of this invention. The invention should not be restricted to that set forth herein for illustrative purposes only.

We claim:

1. A method of modifying a polymeric substrate comprising exposing the polymeric substrate to a flame where the flame is supported by an oxidizer and fuel mixture that includes at least one sulfur-containing compound that functions as a fuel substitute, the sulfur-containing compound comprising hydrogen sulfide or a mecaptan.

2. The method of claim 1 wherein the mixture of oxidizer and fuel is fuel-lean.

3. The method of claim 1 wherein the mixture of oxidizer and fuel is fuel-rich.

4. The method of claim 1 wherein the sulfur-containing compound comprises hydrogen sulfide.

5. A polymeric substrate having on at least one surface an adhesion-promoting treatment provided by the method of claim 1.

6. A polymeric substrate treated on at least one surface by the method of claim 1 and having a metal layer adhered to the treated surface.

7. A polymeric substrate having a surface treatment comprising a surface that comprises at least one oxidized sulfur-containing chemical group and at least one nitrogen-containing chemical group from the group consisting of nitroso and nitrosoamine.

8. The polymeric substrate of claim 7 wherein the oxidized sulfur-containing chemical group is a sulfate, a sulfone, a sulfonate, or a sulfonic acid.

9. A polymeric substrate having a treated surface comprising a surface that comprises at least one oxidized sulfur-containing chemical group and at least one unoxidized sulfur-containing chemical group.

10. The polymeric substrate of claim 9 wherein the oxidized sulfur-containing chemical group comprises a sulfate, a sulfone, a sulfonate, or a sulfonic acid.

11. The polymeric substrate of claim 9 wherein the unoxidized sulfur-containing chemical group comprises a sulfide or a thiol.

12. A polymeric substrate having an adhesion-promoting treatment comprising oxidized and unoxidized sulfur-containing groups on at least one surface, and a metal layer adhered to that surface.

13. A method of modifying a polymeric substrate comprising exposing the polymeric substrate to a flame where the flame is supported by an oxidizer and fuel mixture that includes at least one sulfur-containing compound that is a gas at room temperature and pressure and functions as a fuel substitute.

14. The method of claim 13 wherein the mixture of oxidizer and fuel is fuel-lean.

15. The method of claim 13 wherein the mixture of oxidizer and fuel is fuel-rich.

16. The method of claim 13 wherein the sulfur-containing compound comprises hydrogen sulfide.

17. A polymeric substrate having on at least one surface an adhesion-promoting treatment provided by the method of claim 13.

18. A polymeric substrate treated on at least one surface by the method of claim 13 and having a metal layer adhered to the treated surface.

* * * * *

UNITED STATES PATENT AND TRADEMARK OFFICE
CERTIFICATE OF CORRECTION

PATENT NO. : 6,780,519 B1
DATED : August 24, 2004
INVENTOR(S) : Strobel, Mark A.

It is certified that error appears in the above-identified patent and that said Letters Patent is hereby corrected as shown below:

Column 1,
Line 41, delete the word "fame" and insert in place thereof -- flame --.

Column 2,
Line 20, after "addition" delete ";" and insert in place thereof -- , --.

Column 7,
Line 35, delete "± 2 mJ/M$^2$" and insert in place thereof -- ± 2 mJ/m$^2$ --.

Column 8,
Line 65, delete "TC-10" and insert in place thereof -- TC-100 --.

Column 13,
Line 63, delete the word "mecaptan" and insert in place thereof -- mercaptan --.

Signed and Sealed this

Tenth Day of May, 2005

JON W. DUDAS
*Director of the United States Patent and Trademark Office*